United States Patent
Heiselbetz

(10) Patent No.: US 11,162,408 B2
(45) Date of Patent: Nov. 2, 2021

(54) FASTENING DEVICE FOR A SHIELDING PART, IN PARTICULAR FOR A HEAT SHIELD, AND SHIELDING PART HAVING AT LEAST ONE FASTENING DEVICE

(71) Applicant: ELRINGKLINGER AG, Dettingen-Erms (DE)

(72) Inventor: Gerald Heiselbetz, Langenzenn (DE)

(73) Assignee: ElringKlinger AG, Dettingen-Erms (DE)

( * ) Notice: Subject to any disclaimer, the term of this patent is extended or adjusted under 35 U.S.C. 154(b) by 494 days.

(21) Appl. No.: 16/091,329

(22) PCT Filed: Mar. 16, 2017

(86) PCT No.: PCT/EP2017/056269
§ 371 (c)(1),
(2) Date: Oct. 4, 2018

(87) PCT Pub. No.: WO2017/174323
PCT Pub. Date: Oct. 12, 2017

(65) Prior Publication Data
US 2019/0145300 A1  May 16, 2019

(30) Foreign Application Priority Data

Apr. 5, 2016  (DE) .......................... 102016106150.6

(51) Int. Cl.
*F01N 13/18* (2010.01)
*B60R 13/08* (2006.01)
(Continued)

(52) U.S. Cl.
CPC ...... *F01N 13/1855* (2013.01); *B60R 13/0876* (2013.01); *F01N 13/102* (2013.01);
(Continued)

(58) Field of Classification Search
CPC ............... F01N 13/102; F01N 13/1855; F01N 13/1811; F01N 13/1822; F01N 2450/24
(Continued)

(56) References Cited

U.S. PATENT DOCUMENTS 4,957,279 A * 9/1990 Thorn ..................... F16F 7/087
248/562
7,065,963 B2 * 6/2006 Niwa .................. B60R 13/0876
165/72

(Continued)

FOREIGN PATENT DOCUMENTS

DE  602004002062 T2  1/2007
JP      2013130139 A   7/2013

*Primary Examiner* — Tom P Duong

(57) ABSTRACT

A fastening device for fastening a shielding part to a fastening partner in a vibration-decoupled manner
  having a collar bushing that has at least one bushing core and two collars that protrude outward in a radial direction (R) and are spaced apart from each other in an axial direction (A), with the collars forming an interstice between themselves and
  having a bridge element, which is positioned with its radially inner region in the interstice; and
  the bushing core extends through an opening of the bridge element with a radial play (s),
wherein a damping element is positioned in the axial direction (A) between the collars and in the radial direction (R) between the bushing core and a radial stop of the bridge element and is dimensioned so that the radial mobility of the bridge element relative to the bushing core is limited to an effective radial play (s') that is reduced relative to the radial play (s).

19 Claims, 16 Drawing Sheets

(51) Int. Cl.
  *F01N 13/10* (2010.01)
  *F01N 13/14* (2010.01)
(52) U.S. Cl.
  CPC .......... *F01N 13/14* (2013.01); *F01N 13/1811* (2013.01); *F01N 13/1822* (2013.01); *B60R 2013/0807* (2013.01); *F01N 2450/24* (2013.01)
(58) Field of Classification Search
  USPC ........................................................ 184/240
  See application file for complete search history.

(56) References Cited

U.S. PATENT DOCUMENTS

| | | | | |
|---|---|---|---|---|
| 7,189,024 | B2 * | 3/2007 | Cameron | E04H 15/64 |
| | | | | 135/118 |
| 7,273,128 | B2 * | 9/2007 | Niwa | B60R 13/0876 |
| | | | | 181/207 |
| 7,284,748 | B2 * | 10/2007 | Mishima | F02B 77/11 |
| | | | | 267/140.11 |
| 8,104,573 | B2 * | 1/2012 | Oxenknecht | B60R 13/0876 |
| | | | | 181/284 |
| 2011/0067952 | A1 * | 3/2011 | Oxenknecht | B60R 13/0876 |
| | | | | 181/284 |
| 2011/0076096 | A1 * | 3/2011 | Slayne | F16D 3/06 |
| | | | | 403/372 |
| 2013/0034377 | A1 | 2/2013 | Friedow et al. | |

* cited by examiner

FASTENING DEVICE FOR A SHIELDING PART, IN PARTICULAR FOR A HEAT SHIELD, AND SHIELDING PART HAVING AT LEAST ONE FASTENING DEVICE

FIELD OF THE INVENTION

The invention relates to a fastening device for a shielding part, in particular for a fastening a shielding part to a fastening partner in a vibration-decoupled manner, and to a shielding part.

BACKGROUND OF THE INVENTION

In order to shield heat that is radiated, for example from particularly hot components/assemblies of motor vehicles, it is known to protect adjacent components—for which such thermal radiation would be harmful—by providing them with shielding parts that are designed to keep radiated heat away from the components that are to be protected. Shielding parts of this kind are usually flat, thin-walled structural components, which can have a single-layer or multi-layer design and are usually composed of aluminum or sheet steel, possibly with an intermediate layer of nonmetallic insulating layers. Such shielding parts can be fastened—e.g. spaced apart from—the heat-emitting component, for example an exhaust manifold, a turbocharger, an engine block, or a transmission assembly. Such shielding parts, which are also referred to in professional circles as heat shields or thermal shield components, in addition to the thermal stress, are also often subjected to vibrations, which constitute a high mechanical stress for a shielding part. Particularly in the vicinity of fastening points at which the shielding part is attached, for example to a hot part, unwanted vibrations often result in damage to the shielding part, for example the formation of stress cracks.

There is also the problem that such shielding parts can expand considerably when heated and it is therefore necessary to suitably provide a compensation for the thermal expansions that occur between the fastening points of the shielding part.

A number of fastening devices for shielding parts, in particular heat shields, for achieving these objectives are known from the prior art.

A fastening device for a shielding part is known, for example, from DE 60 2004 002 062 T2. Such a fastening device has a collar bushing element; a bridge element is supported in an interstice between two collars, which element extends radially toward the outside and can be connected to a heat shield in a radially outer region. The bridge element has a radial play relative to the collar bushing so that the collar bushing is positioned in movable fashion in a radial direction relative to the bridge element.

The collar bushing has a through opening through which a fastener, e.g. a screw or a bolt, can be inserted making it possible to fasten the shielding part to a fastening partner, e.g. the hot part.

Based on this prior art, the object underlying the invention is to improve a fastening device of this generic type with regard to its noise generation when subject to a vibration load, particularly when the maximum possible radial movement position of the bushing relative to the bridge element is reached.

In addition, a fastening device for a shielding part, in particular a heat shield, should be disclosed, which, at a fastening point, successfully achieves a particularly high degree of decoupling of the shielding part from a fastening partner with regard to mechanical vibrations in both the axial and radial direction. It should in particular be possible to preassemble such a fastening device, particularly in the form of a module-like assembly, and to easily install it in a wide range of different sheet thicknesses of the shielding part.

SUMMARY OF THE INVENTION

A fastening device for fastening a shielding part to a fastening partner in a vibration-decoupled manner has:
  a collar bushing having at least one bushing core and two outward-protruding collars extending in the radial direction R relative to a center axis M of the collar bushing, spaced apart from each other in an axial direction A, with the collars forming an interstice between themselves in the axial direction A and
  at least one bridge element, which is positioned with its radially inner region in the interstice and, with a radially outer region can be connected to a shielding part; and
  the collar bushing extends through an opening of the bridge element with a radial play s and the bridge element can be moved radially relative to the bushing core radial.

According to the invention, a fastening device of this kind is modified such that a damping element is provided that is positioned between the collars in the axial direction A and the damping element is positioned between the bushing core and a radial stop of the bridge element in the radial direction R and is dimensioned so that the radial mobility of the bridge element relative to the bushing core is limited to an effective radial play s' that is less than the radial play s.

The provision of such a damping element results in the fact that with a radial movement of the bushing relative to the one bridge element, the at least one bridge element and the bushing cannot come into hard contact in the radial direction. Before this can take place with a correspondingly large radial movement of the bushing relative to the at least one bridge element, the damping element is already in a blocking position and prevents a hard and thus noisy collision of the bushing and the at least one bridge element in the radial direction.

In this case, the damping element is advantageously embodied as more deformable than the collar bushing and/or the at least one bridge element. Consequently the damping element insures a play limitation of the bushing relative to the bridge element that is gentle and noiseless—or involves very little noise—like a cushion.

In another embodiment, the at least one bridge element is supported in a radially movable fashion with a first sliding section in a gap between the damping element and one of the collars. This insures a defined guidance of the bridge element inside the interstice in the axial direction, which guarantees that the collar bushing is likewise guided in defined way in the axial direction relative to the bridge element. In addition, the damping element—as a component of an axial immobilization of the bridge element relative to the collar bushing—can also exert a damping action in the axial direction if, in the installed state, the shielding part, for example, is set into a vibration in the axial direction A relative to the collar bushing that is firmly mounted to the fastening partner in stationary fashion. This also makes it possible to embody the bridge element in a single layer and to provide such a one-layered bridge element with a defined guidance relative to the collar bushing.

In another embodiment of the invention, the at least one bridge element has the first sliding section and at least one other sliding section and is axially supported with the sliding sections against opposite insides of the collars facing the interstice. With this embodiment it is possible to achieve an axially defined guidance of the bridge element relative to the collar bushing in a simple way.

In another embodiment of the invention, the radial stop of the bridge element is embodied as a connecting section of the bridge element, which connects the sliding sections to each other. Alternatively, e.g. with a one-layered bridge element, the connecting section connects the one sliding section of the bridge element to the radially outer region of the bridge element with which the bridge element can be immobilized on the shielding part.

In another embodiment of the invention, the contact regions between the sliding sections and the insides overlap each other when viewed in the axial direction A. Such a measure contributes to a low space requirement in the radial direction R. For example, even slight radial collar overhangs of the collars over the bushing core can be sufficient.

Alternative to the above-described embodiment, the contact regions can be embodied as not radially overlapping when viewed in the axial direction A or can even have a radial spacing relative to each other. In comparison to the embodiment described above, such an embodiment takes up somewhat more radial installation space, but has the advantage of simplifying a shape of the bridge element particularly when it is embodied as a deep-drawn stamped part or the like.

In a particular embodiment, the radial stop delimits the interstice radially toward the outside. This measure makes it possible to effectively partition off the interstice toward the outside, thus reducing the tendency of the interstice to become contaminated during use of the fastening device or shielding part.

In an advantageous embodiment of the invention, the radial inside of the damping element rests against an outside of the bushing core facing the interstice and is able to move together with the collar bushing radially relative to the bridge element. This makes it possible, through a suitable positioning of the radial stop on the bridge element, to preselect the limited effective radial play s' in a simple way. For example, by selecting different bridge elements whose radial stops are placed in different radial positions, it is possible based on structurally identical bushing/damping element combinations to produce fastening devices with different effective radial plays s'.

Alternative to the above-mentioned embodiment, it can be advantageous to allow the radial outside of the damping element to rest against an inside of the radial stop facing the interstice and to produce the effective radial play s' between the damping element and the bushing core. As a result, the damping element can be moved radially together with the bridge element relative to the collar bushing. In this embodiment, for example the collar bushings and the bridge elements can exist in the form of standard components with the same geometrical dimensions. Various fastening devices having different effective radial plays s' can, for example, be adapted by simply matching the geometrical outer dimensions of the damping element, particularly viewed in the radial direction R.

It also falls within the scope of the invention to provide the effective radial play $s' \leq 0$ mm so that the damping element is positioned without radial play or in a radially elastically prestressed fashion between the bushing core and the radial stop. With such an embodiment, the elastic deformability and inherent damping of the damping element influence the vibration-transmission behavior between the bridge element and the collar bushing in the radial direction R. This embodiment is particularly advantageous if a sliding seat of the collar bushing relative to the bridge element is not wanted.

The damping element is advantageously comprised of a wire mesh, wire tangle, or wire knit composed of a metal wire or plastic wire. Alternatively, the damping element can also be composed of a metal foam and/or plastic foam.

The bridge element is advantageously embodied in a single layer, e.g. composed of stainless steel, for example embodied in the form of a stamped and bent part or a deep-drawn stamped part.

Alternatively, the bridge element can have a multi-layer design and at least one first layer can form the first sliding section and a second layer can form the second sliding section. In this connection, it appears to be particularly advantageous for the layers of the bridge element to be embodied as non-variable parts.

The at least one layer of the bridge element is advantageously composed of a stainless steel sheet with a thickness of 0.2 mm to 0.5 mm.

To manufacture a preassembled module, it is advantageous that the collar bushing bundles the at least one bridge element and the damping element in captive fashion so that the fastening device can be preassembled as a module and, as a preassembled subassembly that forms a single unit, can be inserted into a receiving hole of the shielding part.

To affix the fastening device in the receiving hole of the shielding part, it is advantageous for the bridge element to have connecting elements radially outside the collar bushing. For example, the connecting elements are embodied in the form of tabs, with the tabs being embodied of one piece with the one layer or with one of the plurality of layers of the bridge element. This makes it possible to omit the provision of separate fasteners. With the invention according to this embodiment, the connecting elements are embodied as integral to the bridge element.

To enable the radial stop to collide with the damping element in a gentler way, it is advantageous to position the radial stop—viewed in cross-section—as at least partially inclined at an angle α relative to the axial direction A.

In the above-mentioned case, the damping element has at least one inclined surface that corresponds to the inclined radial stop. In this connection, it has turned out that such an embodiment has a particularly noise-reducing action if the bridge element and damping element collide with each other in a radial direction.

In order to reduce wear in the region of the contact zones, it is advantageous for the bridge element and/or the insides of the collars to be provided with raised areas and/or recesses so that the sliding sections are supported relative to the collars by means of point contact or linear contact or by means of defined sliding surfaces. In this case, it is advantageous that the friction contact between the bridge element and the inside or insides of the collars is less sensitive to contamination, i.e. that the forces required to overcome the frictional contact for a movement of the bushing relative to the bridge element in the radial direction R are more independent from contamination phenomena in the contact zones that may occur during operation.

BRIEF DESCRIPTION OF THE DRAWINGS

The invention will be explained in greater detail below by way of example based on the drawings. In the drawings.

DETAILED DESCRIPTION OF THE PREFERRED EMBODIMENTS

Figure 1:
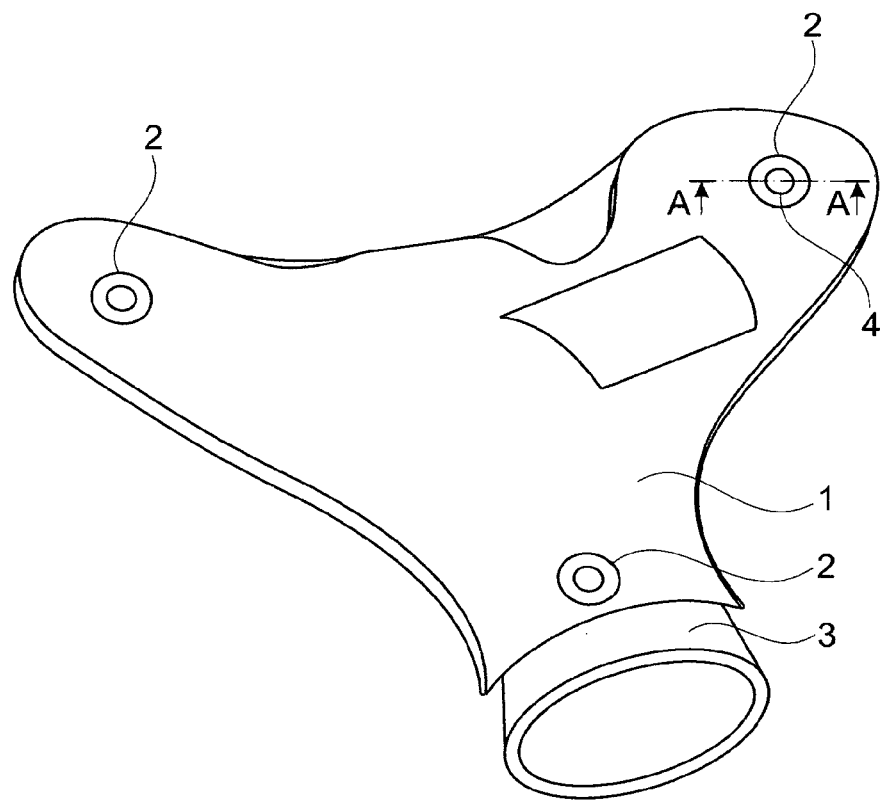
FIG. 1: schematically depicts a perspective view of a shielding part according to the invention with a plurality of fastening openings for accommodating a fastening device according to the invention.

FIG. 1 shows a shielding part 1, which is a heat shield, for example. The shielding part 1 has fastening points 2 at which the shielding part 1 can be fastened to a fastening partner 3, e.g. an exhaust manifold of a motor vehicle. Shielding parts 1 of this kind are usually composed of a metal material, in particular a metal sheet, and are composed of one or more layers. Usually, shielding parts 1 have an expansive three-dimensional shape and for example, are embodied so that their shape approximates that of the fastening partner 3. Between the fastening partner 3 and the shielding part 1—except for the fastening points 2—there is usually an air gap, which is dimensioned so that vibrations that occur in the shielding part 1 do not result in a collision with the fastening partner 3. The shielding part 1 can be made of a steel material or an aluminum material. In addition to a heat-shielding function, shielding parts 1 of this kind often also perform the task of providing for an acoustic insulation from noise sources. One example of such noise sources is turbochargers. Shielding parts 1 as defined by the invention can be fastened to a fastening partner 3, which is the thermal/heat source. The shielding parts 1 can also be fastened to components that are to be protected, e.g. the chassis. Such shielding parts 1 are usually subjected to a high temperature fluctuation load, which can, for example, reach from −50° top +900° or more. When such shielding parts 1 have a relatively large three-dimensional shape, not insignificant spacing changes between the fastening points 2 occur between the fastening points 2 due to thermal expansion effects. For example, if a thermal expansion of the fastening partner 3 is more pronounced than a thermal expansion of the shielding part 1, then a sliding seat must be suitably provided in at least one fastening point 2 in order to avoid impermissibly high thermal stresses in the shielding part 1. In addition, the shielding part 1 should be decoupled as much as possible from the fastening partner 3 with regard to vibrations that are introduced into the shielding part 1, whether by the fastening partner 3 or for example due to natural vibrations. For the vibration-decoupled fastening of a shielding part 1 to a fastening partner 3, the invention proposes fastening devices 5, which are described in detail by way of example below and are mounted or can be mounted in a receiving hole 4 of the shielding part 1.

All of the embodiments of a fastening device 5 according to the invention for a shielding part 1 described below have a collar bushing 6 with a bushing core 7.

The bushing core 7 has an insertion opening 80 for a fastener, e.g. a screw, with which the collar bushing 6 can be immobilized relative to the fastening partner 3. The fastening partner 3 is embodied with a suitable thread for this purpose. The insertion opening 80 has a center axis M. For the further description of the embodiments, a radial direction R is defined, which is oriented orthogonal to the center axis M. In addition, an axial direction A is defined, which extends parallel to the center axis M. The circumference direction U is defined as any direction extending around the center axis M at a particular radial distance from the center axis M.

The collar bushing 6 also has two collars 8, 9 extending radially outward from the bushing core 7 in the radial direction R, with the first collar 8 and the second collar 9 being spaced apart from each other by a distance a in the axial direction A. The collars 8, 9 thus form an interstice 10 between themselves. In order to connect the collar bushing 6 to the shielding part 1, the fastening device 5 has a bridge element 11, which can be embodied of a single piece (see the embodiments according to FIGS. 13 through 16). In the embodiments according to FIGS. 2 through 12, the bridge element 11 is composed of two parts, a first part 11a and a second part 11b. A radially inner region 12 of the bridge element 11 is positioned in the interstice 10. A radially outer region 13 of the bridge element 11 can be firmly attached to a hole rim 14 of the receiving hole 4 in the radial direction R, the axial direction A, and the circumference direction U. The bushing core 7 passes through an opening 15 of the bridge element 11 with a radial play s so that the bridge element 11 is able to move within the play s in the radial direction R relative to the bushing core 7, forming a sliding seat. The radial play s between the bridge element 11 and bushing core 7 is expressed by where $D_i$ is an inner diameter of the opening 15 and $D_{AH}$ is an outer diameter of the bushing core 7.

Figure 2:
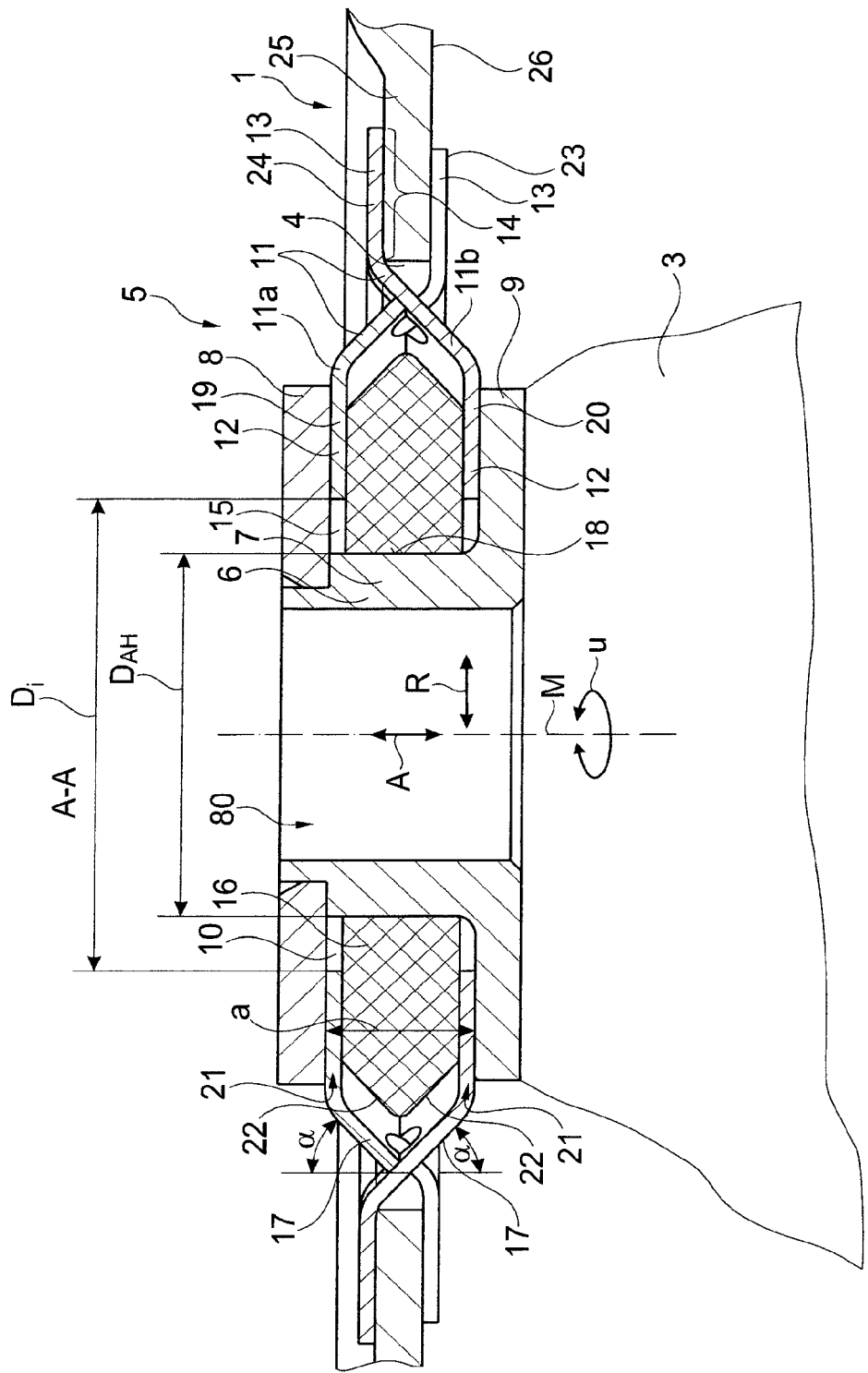
FIG. 2: shows the shielding part according to FIG. 1 in a cross-section along the line A-A from FIG. 1 with a fastening device in a first embodiment.
Figure 3:
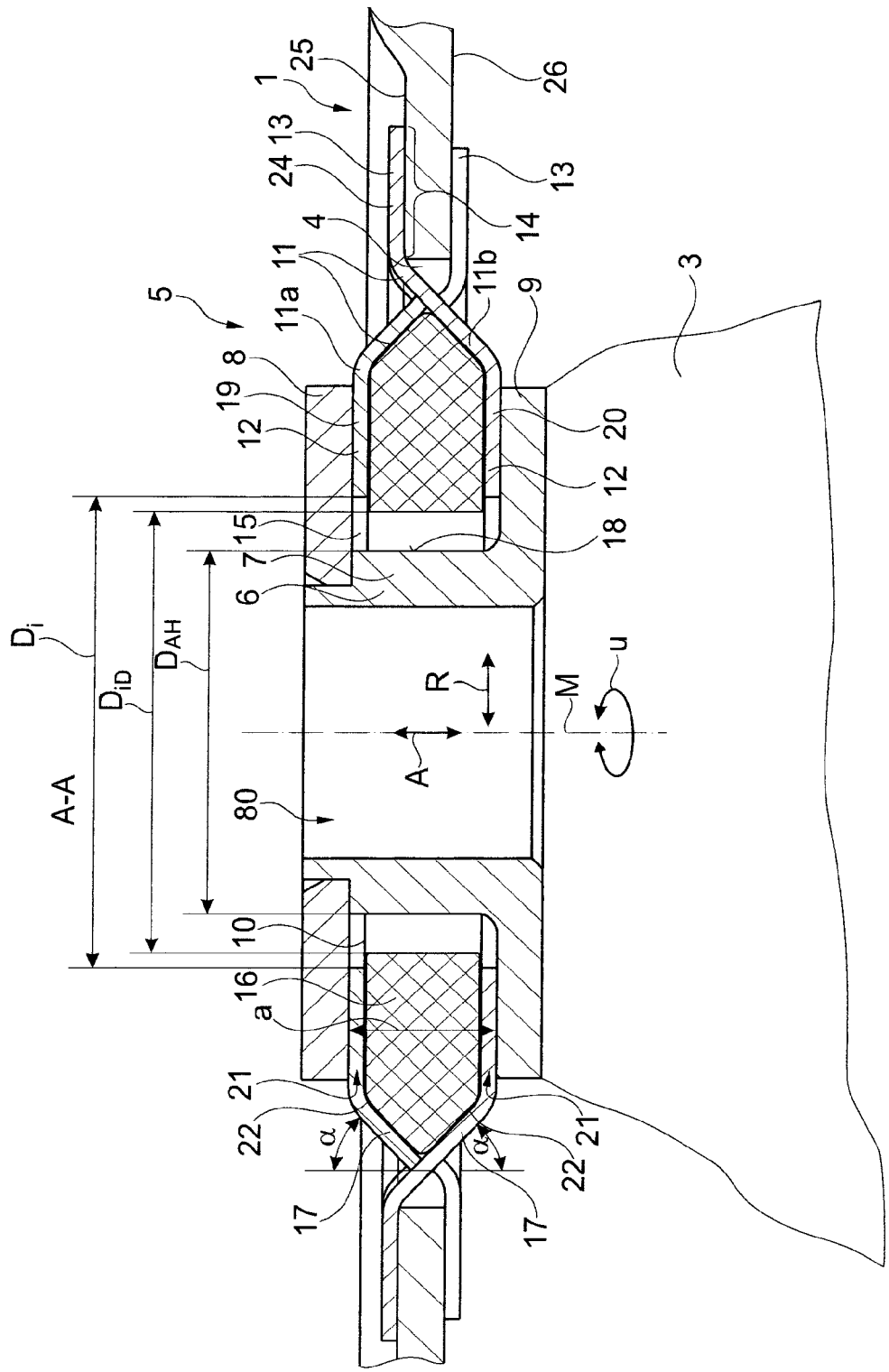
FIG. 3: shows the section along the line A-A, with a fastening device in a second embodiment.
Figure 4:
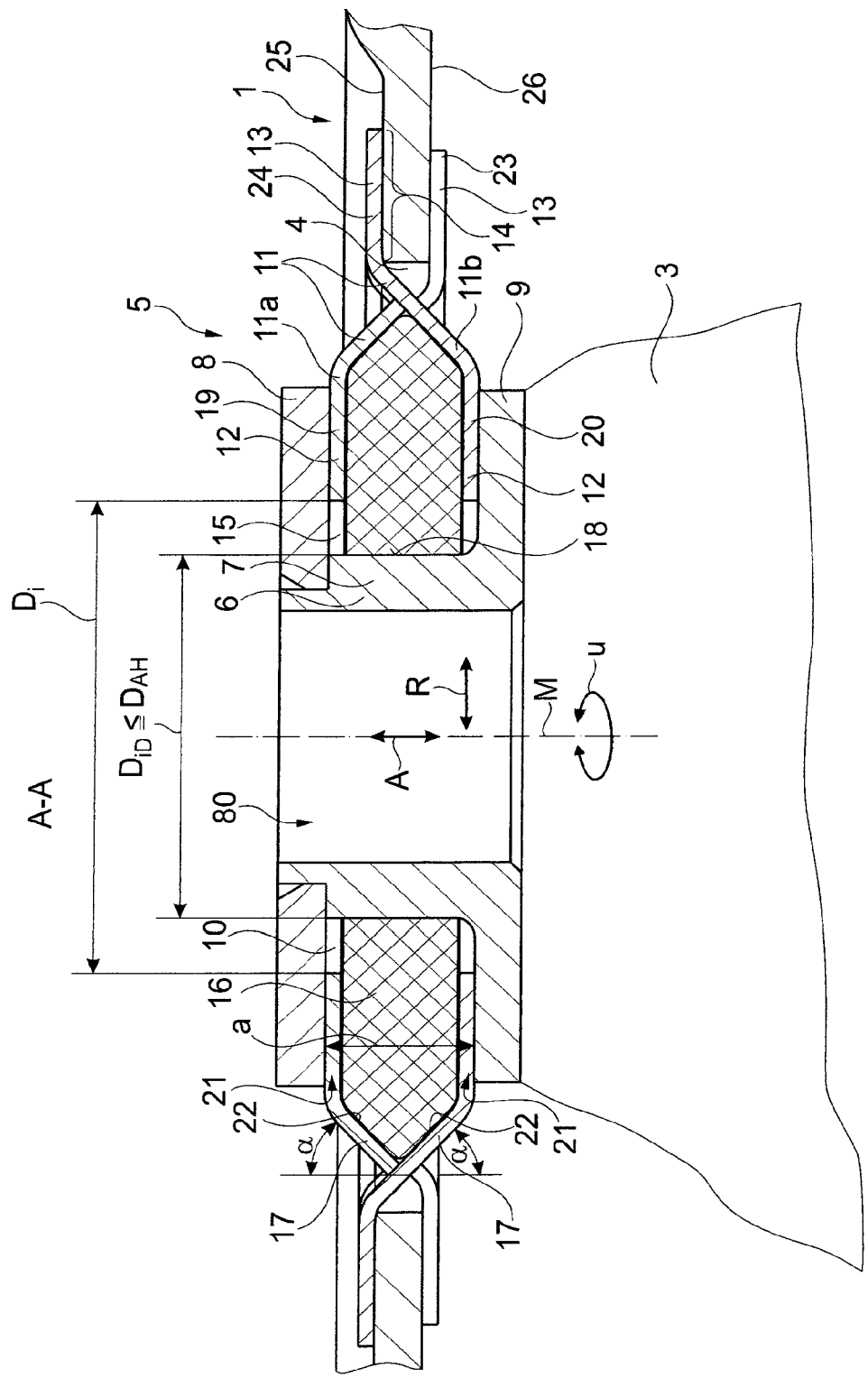
FIG. 4: shows the section along the line A-A, with a fastening device in a third embodiment.
Figure 5:
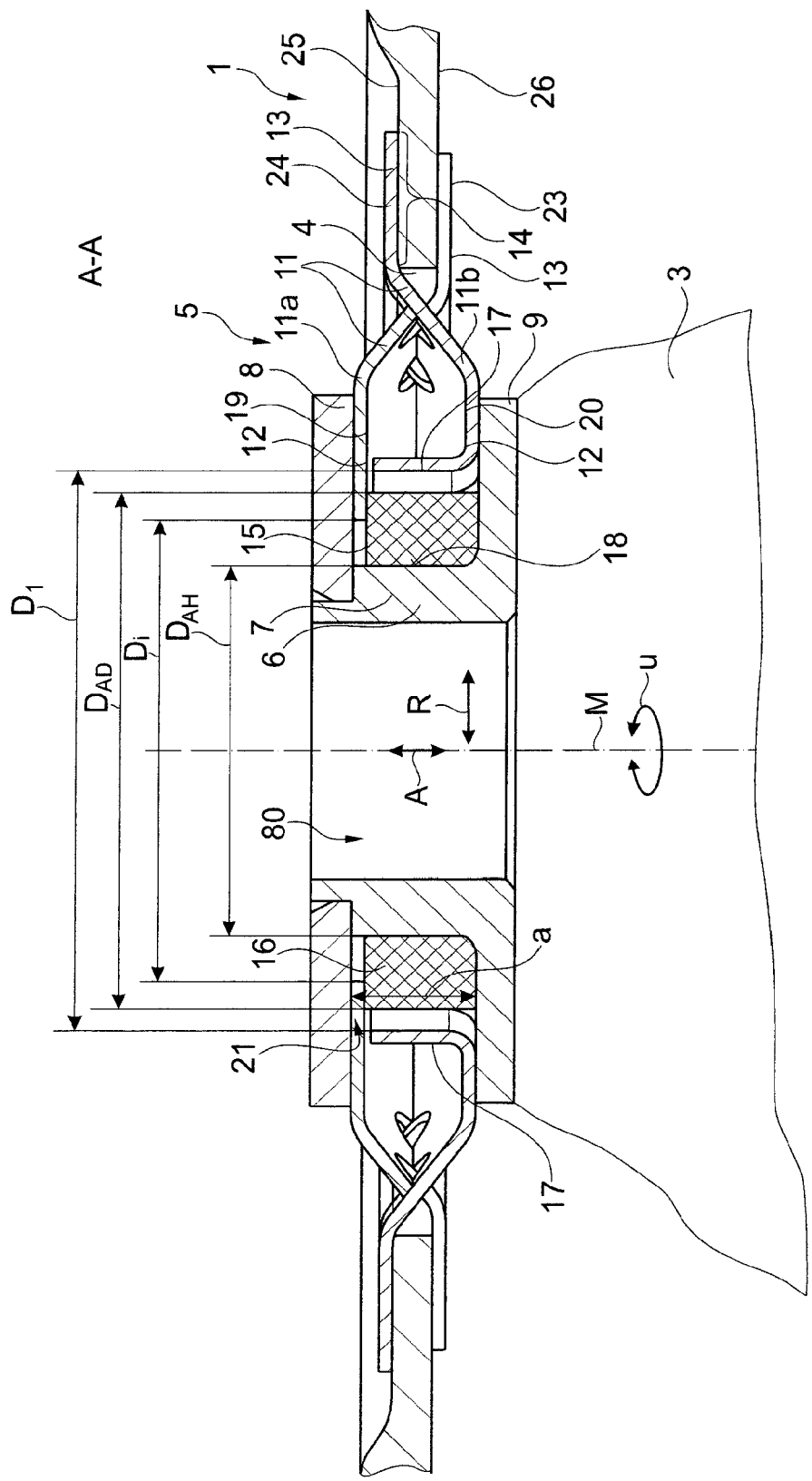
FIG. 5: shows the section along the line A-A, with a fastening device in a fourth embodiment.
Figure 6:
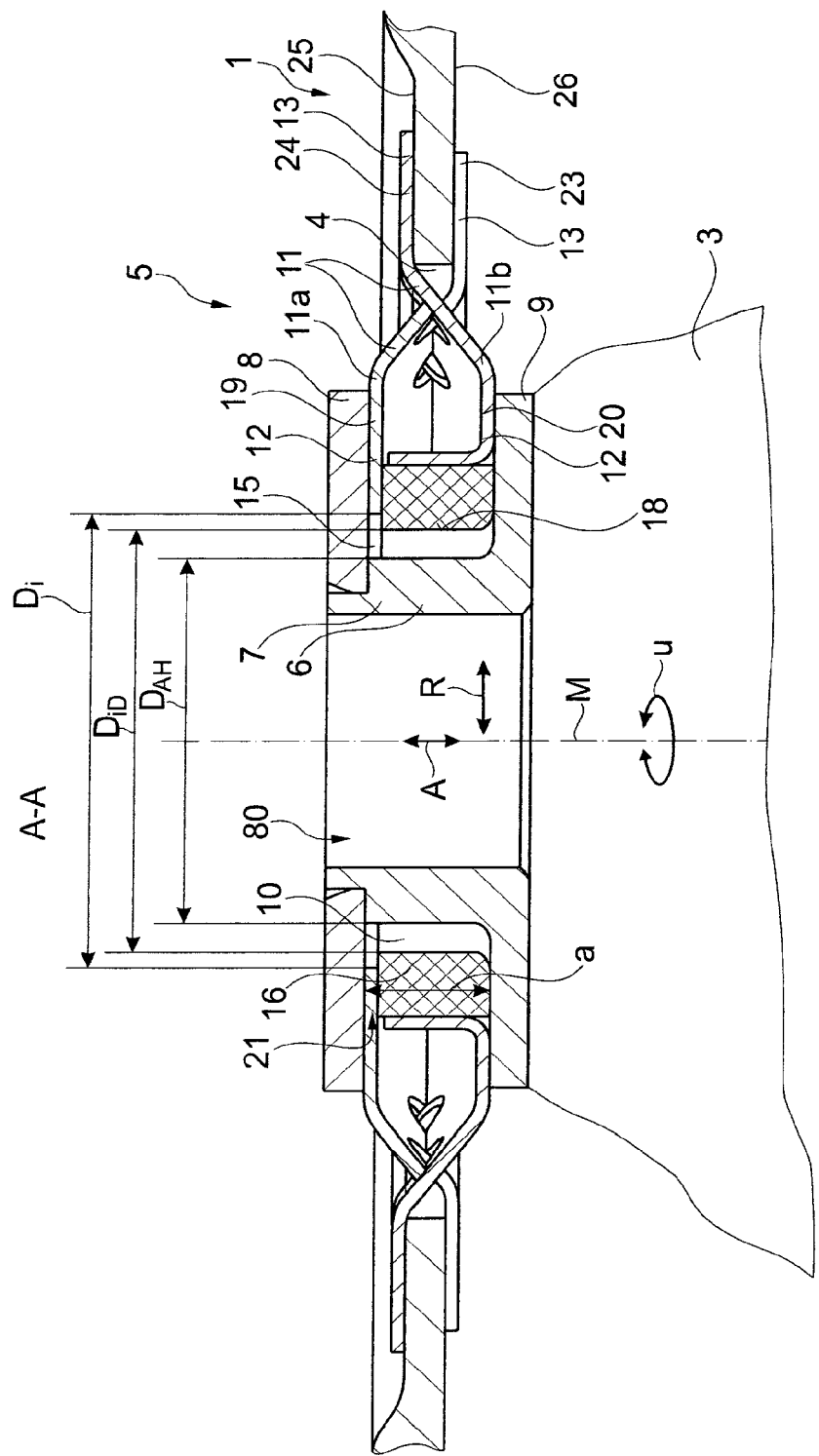
FIG. 6: shows the section along the line A-A, with a fastening device in a fifth embodiment.
Figure 7:
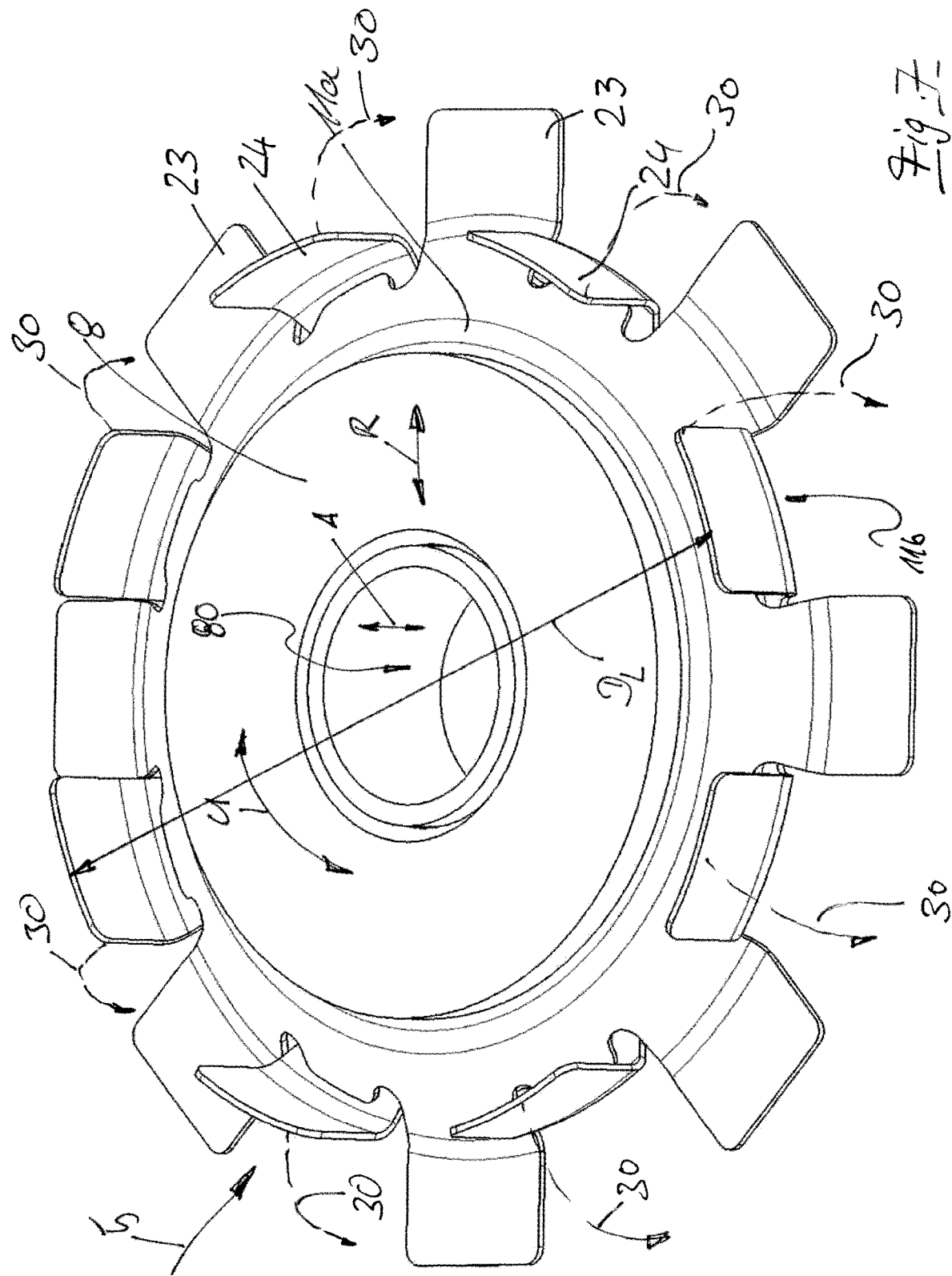
FIG. 7: shows a perspective view of a fastening device in one of the embodiments according to FIGS. 2 through 6 in a preinstallation position.

A damping element 16 is positioned in the interstice 10 in the axial direction A between the collars 8, 9. The damping element 16 is positioned in the radial direction R between the bushing core 7 and a radial stop 17 of the bridge element 11. According to the invention, the damping element 16 is dimensioned so that the radial mobility of the bridge element 11 relative to the bushing core 7, i.e. the radial play s, is limited to a smaller effective radial play s'. This means that with a deflection of the collar bushing 6 from a zero position—as shown in FIG. 2—in the radial direction R, the damping element 16 comes into a radially supported contact with the radial stop 17 before the bridge element 11—particularly by means of the hole edge of the opening 15—comes into contact with an outside 18 of the bushing core 7. As a result, the damping element 16 acts as a cushion and prevents a hard collision of the bridge element 11 against the bushing core 7. In the cross-section according to FIG. 2, the sliding sections 19 and 20 extend essentially in the radial direction R, with the first sliding section 19 cooperating in sliding fashion with the first collar 8 and the second sliding section 20 cooperating in sliding fashion with the second collar 9. Viewed in the axial direction A, the damping element 16 extends between the sliding sections 19 and 20 and preferably, supports the sliding sections 19 and 20 relative to each other in the axial direction A like a spacer. In the axial direction A, the damping element 16 is dimensioned so that the sliding sections 19, 20 are able to move in sliding fashion relative to the damping element 16.

The damping element 16 is embodied as more deformable than the surrounding components with which it is or comes into contact, i.e. particularly compared to the bridge element 11, compared to the collar bushing 6, and especially compared to the bushing core 7. For example, it is embodied as a wire structure composed of a metal wire and in particular, can be a wire mesh, a wire tangle, a wire knit, a wire woven, or a wire crocheted fabric. For low temperature loads, the damping element 16 can also be composed of a plastic wire. Alternatively to this, the damping element 16 can be composed of a metal foam or plastic foam. The essential factor is that the damping element 16 has softly damping cushioning properties relative to the materials that surround it so that a damping element 16 that comes into contact with the components that surround it due to the occurrence of vibrations or movements causes little or no appreciable noise generation.

Because of the above-described dimensions of the damping element 16, particularly in the axial direction A, the sliding sections 19, 20 of the bridge element 11 are also each movably supported in a gap 21 between the collars 8, 9 and the damping element 16. This arrangement makes it possible, in addition to the above-described damping function in the radial direction R, to also use the damping element 16 for axial damping and for axial support of the bridge element 11 relative to the collars 8, 9.

Viewed in cross-section, the radial stop 17 of the bridge element 11 extends at an angle α that is inclined relative to the axial direction A. Corresponding to the inclined radial stop 17, the damping element 16 has inclined surfaces 22 so that the damping element 16 tapers in wedge fashion toward the outside in the radial direction R.

In the radially outer region 13 of the bridge element 11, the first part 11a has a plurality of tabs 23. Corresponding to the tabs 23, the second part 11b has a plurality of tabs 24 in the radially outer region 13. Each pair of tabs 23 of the first part 11a forms a space between themselves, viewed in the circumference direction U, through which a tab 24 of the second part 11b extends in the installed state according to FIG. 2. Conversely, each pair of tabs 24 of the second part 11b forms a space between themselves, viewed in the circumference direction U, through which a tab 23 of the first part 11a extends in the installed state according to FIG. 2. In this way, for example eight tabs 23 of the first part 11a and eight tabs 24 of the second part 11b distributed evenly around the circumference can form the force fit relative to the shielding part 1. The tabs 23, 24 are placed against opposing outsides 25 and 26 of the hole rim 14 of the shielding part 1 so that by means of the tabs 23, 24, the bridge element 11 is firmly attached to the shielding part 1 in the axial direction A, the radial direction R, and the circumference direction U.

The term "firmly" in the above-mentioned context is to be understood to mean that forces usually occurring during operation of the shielding part 1 in the radial direction R and axial direction A and moments around the center axis M do not produce any relative movement in the axial direction A, radial direction R, or circumference direction U between the bridge element 11 and the shielding part 1. The tabs 23, 24 produce a force fit relative to the hole rim 14 so that a relative movement within the play s' that is reduced by the damping element 16 only takes place between the collar bushing 6 and the bridge element 11. In the embodiment of the fastening device 5 according to FIG. 2, such a relative movement in the radial direction R moves the damping element 16 together with the collar bushing 6. There is thus also a relative movement between the damping element 16 and the bridge element 11 or its radial inner regions 12, 13.

The collar bushing 6, the bridge element 11, and the damping element 16 form a preassembled module, with the bushing 6, the bridge element 11, and the damping element 16 being bundled so that the individual parts are secured to one another in captive fashion. Such a module-like fastening device 5 has the advantage that it can be inserted as a unit into the opening 4 of the shielding part 1 without having to perform a precise sequence of individual parts on a possibly large and relatively unwieldy shielding part 1. For the installation of a fastening device 5 according to the invention, the fastening device 5 is placed in a preinstallation position according to FIG. 7. In this preinstallation position, the tabs 24 of the second part 11b of the bridge element 11 are bent so that they point upward in the axial direction A. The tabs 23 of the first part 11a extend essentially in the radial direction R.

The tabs 24 are bent in the axial direction A so that a diameter $D_L$ is smaller than the diameter of the opening 4 in the shielding part 1. If this is the case, then the fastening device 5 can be inserted from one side 25 or 26 in the axial direction A into the opening 4 so that the tabs 23 come to rest against the outside 26. In this position, the tabs 24 protrude through the opening 4. They can then be bent radially outward (arrow direction 30) so that the tabs 24 come to rest on the first outside 25 of the shielding part 1. The tabs 24 and 23 are then crimped axially so that in the vicinity of the hole rim 14 the tabs 23 and 24 produce a force fit for the shielding part 1. The pressing force is established in such a way that there is a snug fit in the axial direction A, the radial direction R, and the circumference direction U for operating forces that occur in the force fit when the shielding part 1 is used as intended.

Figure 8:
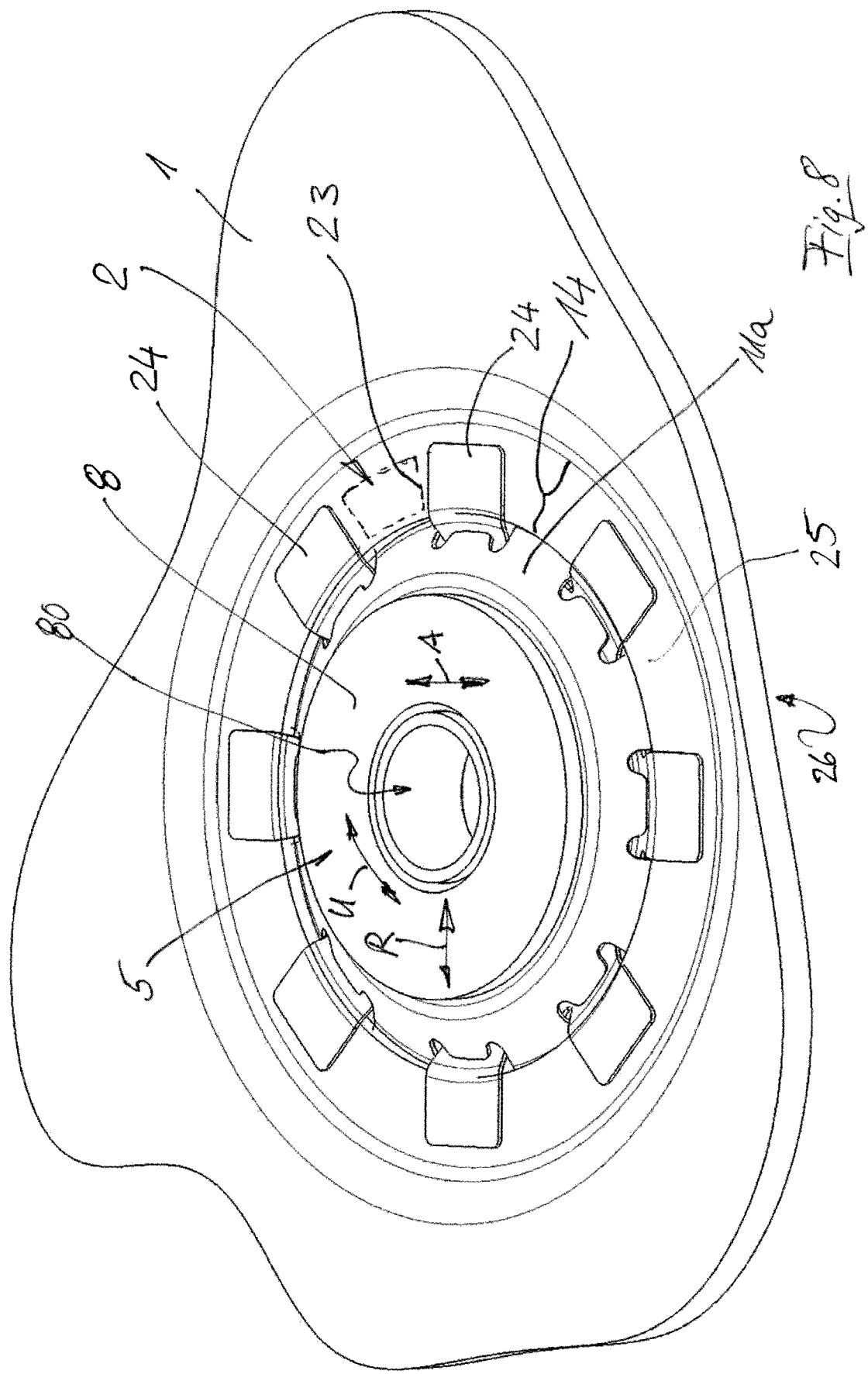
FIG. 8: shows a perspective view of a detail of a shielding part with a fastening device in one of the embodiments according to FIGS. 2 through 6 in the installed state.

FIG. 8 shows a fastening device 5 in one of the embodiments according to FIGS. 2 through 6 in the installed state. The tabs 24 are positioned in a crimped fashion against the outside 25 of the shielding part 1, forming a force fit together with tabs 23 positioned against the opposite outside 26. As a representative of the tabs 23 in FIG. 8, one of these tabs is shown with dashed lines. Naturally every space between two tabs 24 is associated with a tab 23 on the opposite outside 26 of the shielding part 1.

Figure 9:
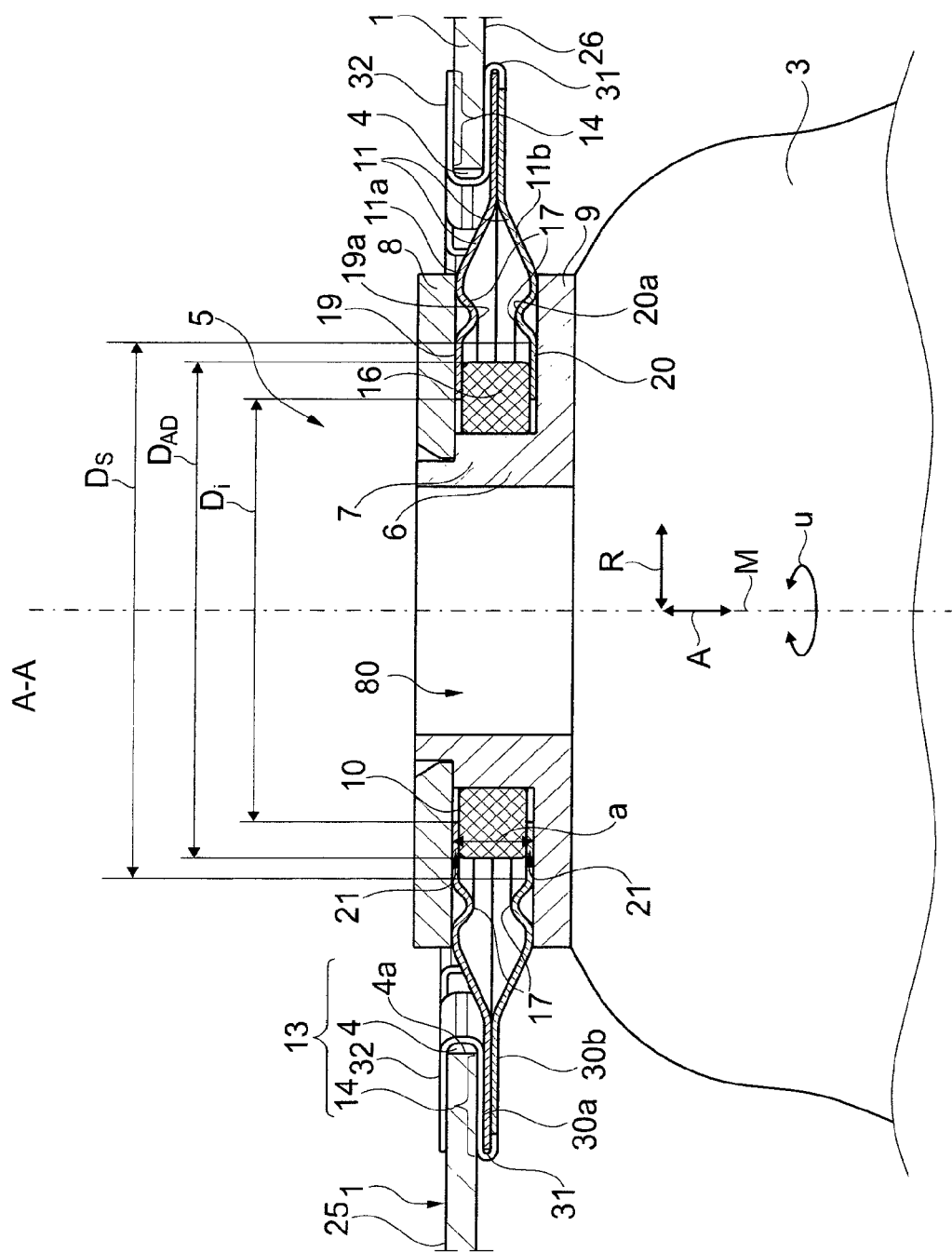
FIG. 9: shows the section along the line A-A, with a fastening device in a sixth embodiment.

A cross-section through another embodiment of the fastening device 5 according to the invention is shown in FIG. 9. In this embodiment, in the region of the first sliding section 19 and second sliding section 20, the first part 11a and second part 11b of the bridge element 11 each have a bead 19a, 20a oriented in the circumference direction U, extending away from the collars 8, 9 in the axial direction A, into the interstice 10. The beads 19a, 20a are positioned spaced approximately the same distance apart from the center axis M in the radial direction R and are therefore situated axially opposite each other.

The beads 19a, 20a narrow the interstice 10 and function as a radial stop 17 for the damping element 16. The damping element 16 is positioned radially inside the beads 19a, 20a and in the exemplary embodiment according to FIG. 9, is positioned around the bushing core 7 without play. Radially toward the outside, the damping element 16 has the effective radial play s' relative to the beads 19a, 20a. In order to embody the effective radial play s' as smaller than the radial play s of the bridge element 1 relative to the bushing core 7 ($s=D_t-D_{AH}$), the beads 19a, 20a are positioned spaced suitably apart from the center axis M in the radial direction so that the damping element 16 comes to rest against the beads 19a, 20a before the bridge element 11 can contact the bushing core 7 when the bushing is shifted in the radial direction R relative to the bridge element.

An alternative to connecting the fastening device 5 to the shielding part 1 is described below based on the exemplary embodiment according to FIG. 9. This relates to a modified embodiment of the radially outer region 13 of the bridge element 11. Radially outside the receiving hole 4, the first part 11a and second part 11b of the bridge element 11 have support flaps 30a, 30b. The support flaps are flat regions with which the parts 11a, 11b are placed against each other in the axial direction A. The two support flaps 30a, 30b of the parts 11a, 11b are situated on one side 26 of the shielding part 1 in the installed state. The support flap 30b that is situated a greater distance from the shielding part 1 in the axial direction A is provided at its radial outer edge with tab-like extensions 31 that are of one piece with it. The tab-like extensions 31 are folded over the support flap 30a of the first part 11a so that the first part 11a and the second part 11b are joined to each other by means of the extensions 31. The extensions 31 extend radially inward to the inside the receiving hole 4 and are folded over around a hole rim 4a of the receiving hole 4 and with a freely extending leg 32, the tab-like extensions 31 rest against the opposite outside 25 of the shielding part 1. In the circumference direction U, there are a plurality of tab-like extensions 31 that are of one piece with the second part 11b. With this type of fastening device 5 on the shielding part 1, it is particularly advantageous that the receiving hole 4 is entirely covered by the fastening device 5 when viewed from above so that thermal radiation from the fastening partner 3 cannot pass through the receiving hole 4. The above-described type of fastening of the fastening device 5 to the shielding part 1 can easily also be used for embodiments of the fastening device 5 according to FIGS. 1 through 6. Conversely, the fastening solution of the fastening device 5 to the shielding part 1 that has been described in connection with FIGS. 2 through 8 can easily also be transferred to the embodiments according to FIGS. 9 and 10.

Figure 10:
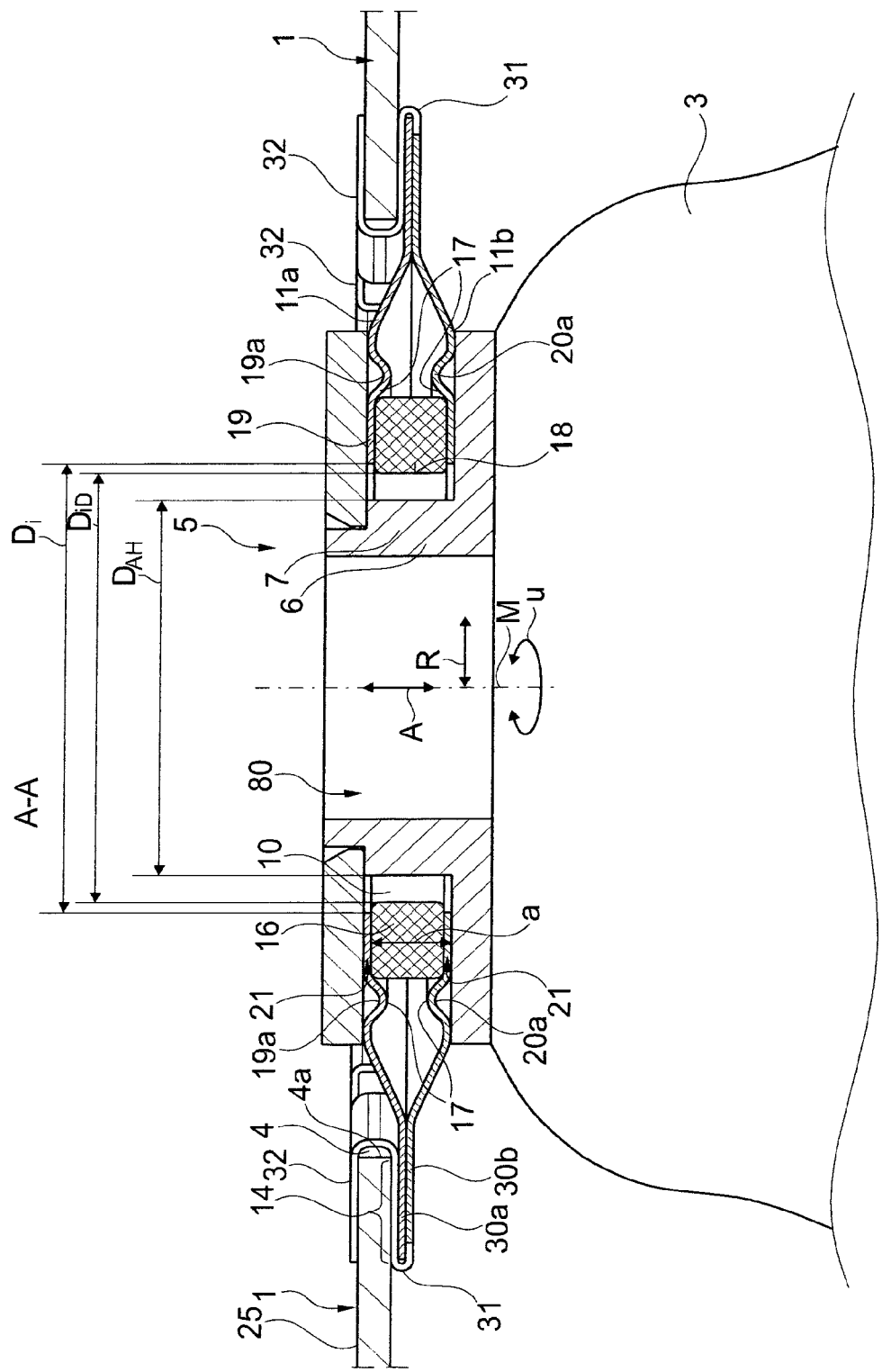
FIG. 10: shows the section along the line A-A, with a fastening device in a seventh embodiment.

FIG. 10 shows an embodiment of the fastening device 5 according to the invention that is modified slightly relative to the embodiment according to FIG. 9. In this embodiment, the damping element 16 has a radial play s' relative to the bushing core 7, which is expressed by the equation $$s'=D_{iD}-D_{AH}.$$

The radial outside of the damping element 16 rests against the beads 19a, 20a and is positioned in stationary fashion relative to the bridge element 11. The collar bushing 6 is supported inside the play s' in a movable fashion relative to the damping element 16 and relative to the bridge element 11; with a radial movement the collar bushing 6 first touches the damping element 16 in the region of the outside 18, in any case before the bridge element 11 reaches the bushing core 7.

The fastening of such a fastening device 5 to the shielding part 1 takes place analogously to the exemplary embodiment according to FIG. 9 by means of tab-like extensions 31, which are formed onto a part 11b so that they are of one piece with it. They are folded over the other part 11a, embracing it radially from the outside, and in their further extension, have a freely extending leg 32, which is folded around the shielding part 1 in the region of the receiving hole 4 so that an essentially S-shaped curve is produced.

Figure 11:
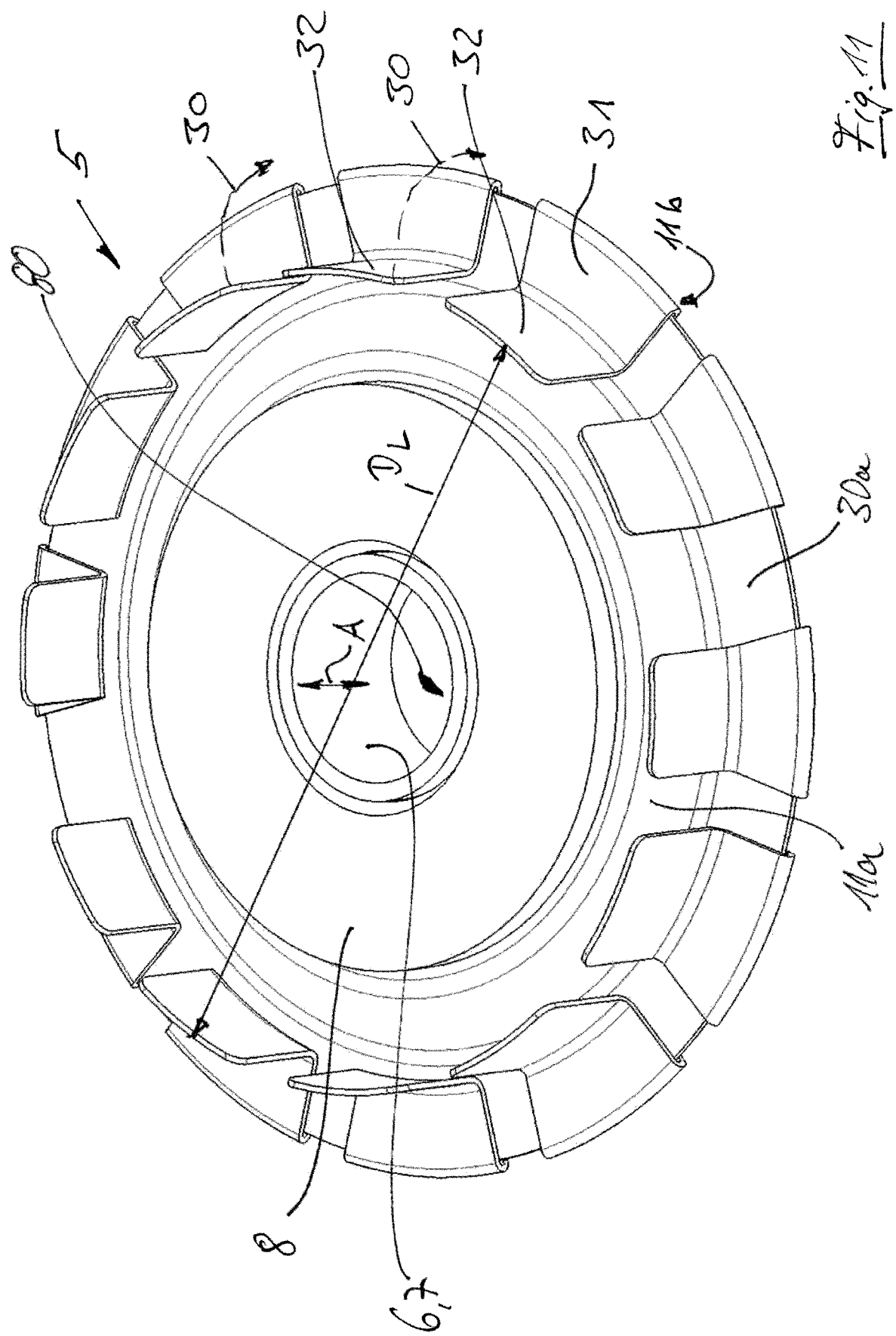
FIG. 11: shows a perspective view of a fastening device according to FIG. 9 or 10 in a preinstallation position.

A preinstallation position of a fastening device 5 in an embodiment according to FIGS. 9 and 10 will now be explained in detail based on FIG. 11.

In this preinstallation position, the tab-like extensions 31 of the second part 11b are folded around a radially outer edge of the support flap 30a of the first part 11a and bent over so that the tab-like extensions 31 connect the first part 11a to the second part 11b by embracing the latter in the region of the support flap 30a.

Figure 12:
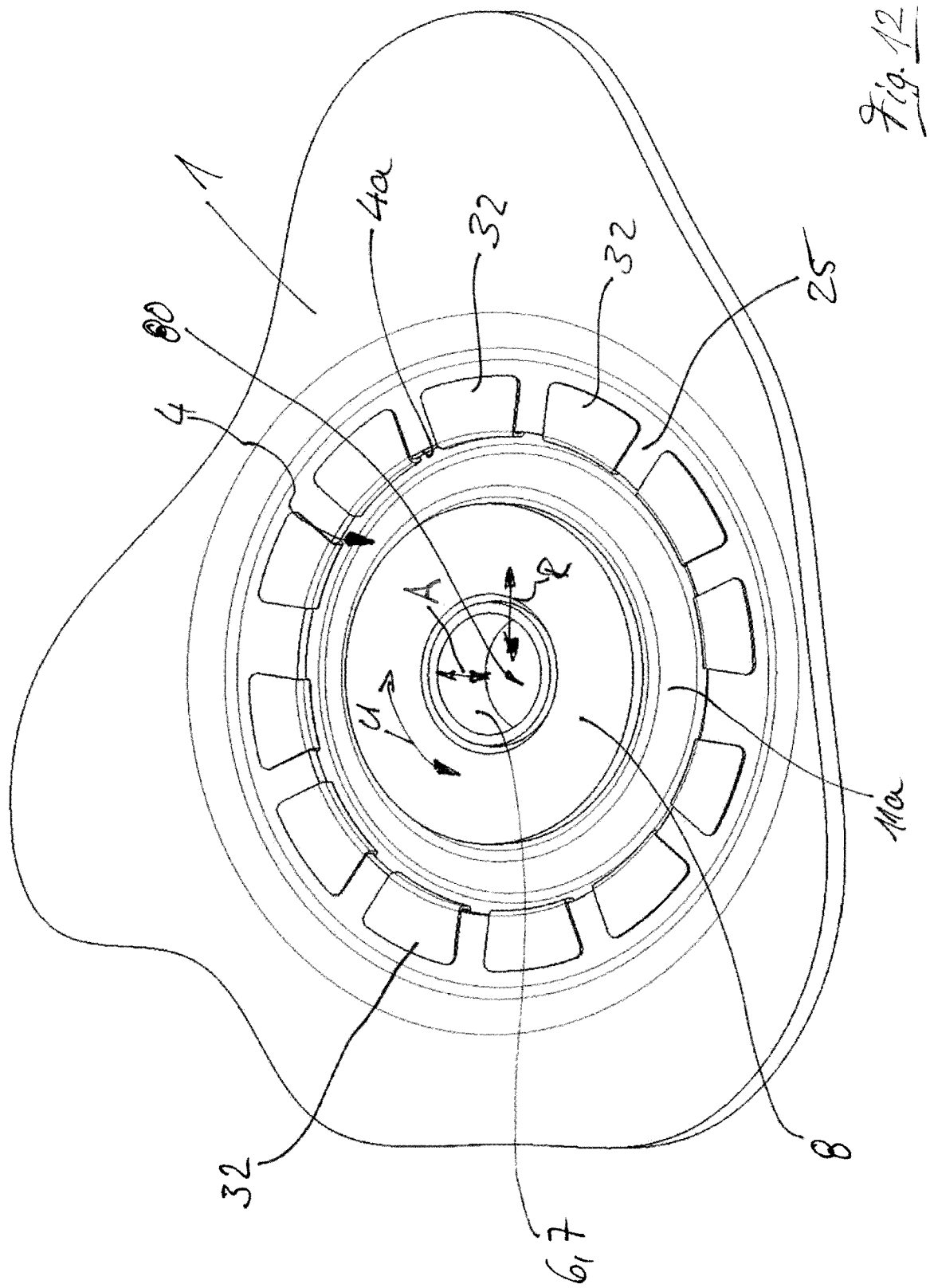
FIG. 12: shows a perspective view of a detail of a shielding part with the fastening device according to FIG. 9 or 10 in the installed state.

The freely extending legs 32 of the tab-like extensions 31 are bent open pointing in the axial direction A. In this position, the opposing tabs have a diameter $D_L$ relative to each other, which is smaller than the diameter of the receiving hole 4 so that the module-like preassembled fastening device 5 can be inserted into the receiving hole 4 in the axial direction A from the side 26 of the shielding part 1. This insertion is carried out until the tab-like extensions 31 rest against the outside 26 of the shielding part 1 with the region with which they embrace the support flaps 30a. In this position, the freely extending legs 32 protrude through the opening 4 and can be bent over in an arrow direction 30 so that they come to rest against the opposite outside 25 of the shielding part 1 and in this way, secure the fastening device 5 in the shielding part 1. FIG. 12 shows a final installation position in which it is clearly apparent that the freely extending legs 32 have been folded around the hole rim 4a of the opening 4 and rest against the outside 25 of the shielding part 1. The freely extending legs 32 are likewise crimped relative to the shielding part 1 so that for forces usually occurring during operation of the shielding part 1 in the axial direction A, radial direction R, or circumference direction U, a force fit of the bridge element 11, i.e. of the two parts 11a and 11b relative to the shielding part 1, is insured.

In another embodiment of the fastening device according to the invention, the bridge element 11 is composed of a one-piece single-layer metal sheet. Several exemplary embodiments will be explained below based on FIGS. 13 through 16, which share the fact that they have a single-layer, one-piece bridge element 11.

In the embodiments according to FIG. 13 through FIG. 16, positioned radially further toward the inside, the bridge element 11 has the first sliding section 19, which cooperates with the first collar 8. The second sliding section 20 is positioned further toward the outside in the radial direction R and cooperates with the second collar 9. The first sliding section 19 and the second sliding section 20 are connected to each other by means of a connecting section 40. The connecting section 40 simultaneously functions as a radial stop 17 for the damping element 16. In the embodiments according to FIGS. 13 and 14, the connecting section 40 is oriented so that it extends in the axial direction A. It bridges the distance a between the collars 8, 9 of the collar bushing 6. The connecting section 40 has a diameter $D_1$, which is greater than the outer diameter $D_{AD}$ of the damping element 16, yielding the reduced effective radial play s' according to the equation $$s'=D_1-D_{AD}.$$

The bushing 6 is positioned so that it is able to move radially relative to the bridge element 11 in the radial direction R within the effective radial play s'. The connecting section 40 closes the interstice 10 at the radial outside so that the damping element 16 is favorably protected from contamination. In its radially outer region, the bridge element 11 has a plurality of tabs 41, 42, which are of one piece with the bridge element 11. The tabs 41 and 42 are distributed over the circumference in the circumference direction U, with the tabs 41 being placed against the outside 26 of the shielding part 1 in the installed state according to FIGS. 13 through 16. The tabs 42 are placed against the opposite outside 25 of the shielding part 1. The tabs 41, 42 are crimped relative to each other so that they produce a force fit; operating forces between the bridge element 11 and the shielding part 1 that normally occur during operation do not cause any movement of the bridge element 11 in the axial direction A, the radial direction R, or the circumference direction U.

Figure 13:
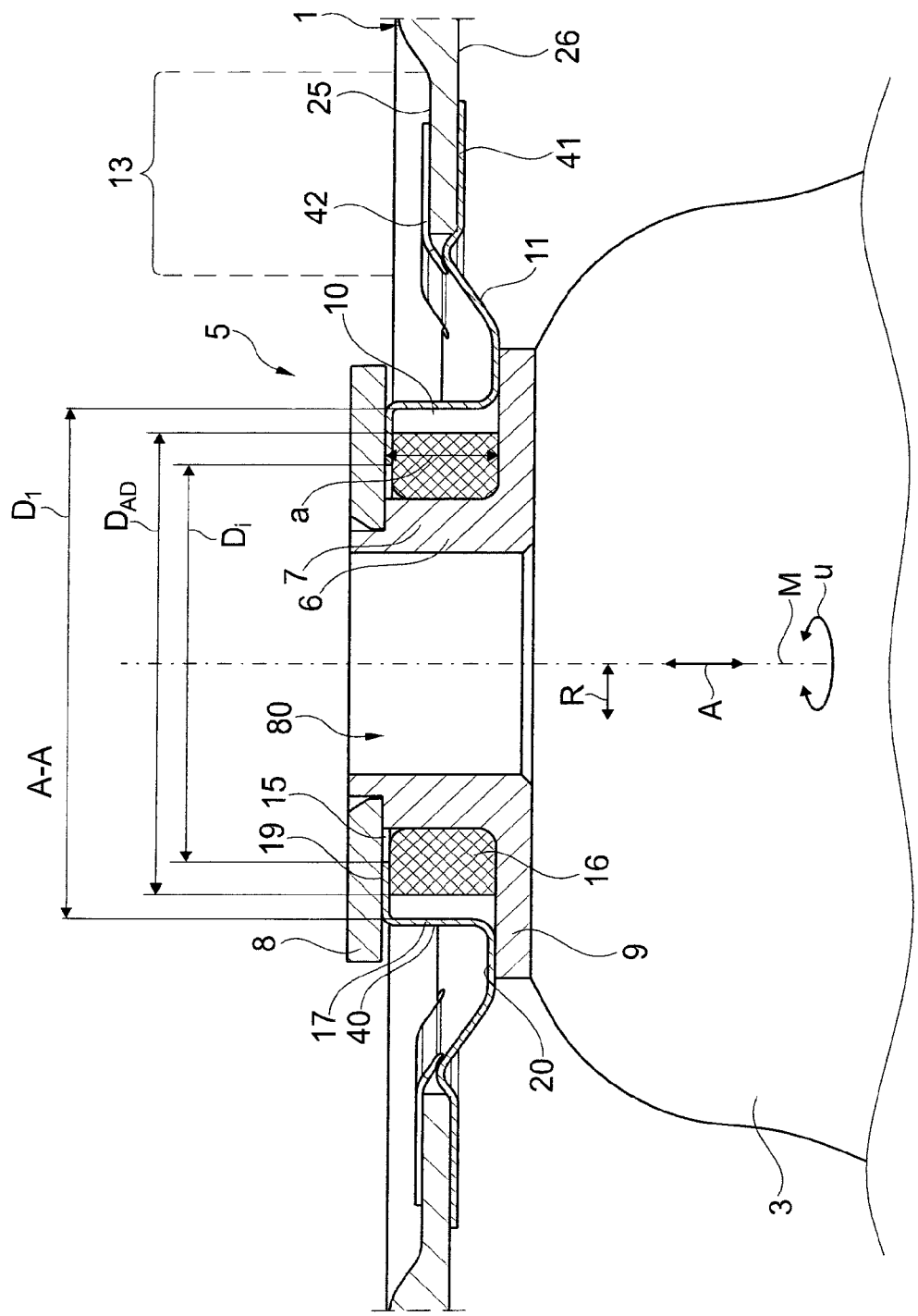
FIG. 13: shows the section along the line A-A, with a fastening device in an eighth embodiment.

In the exemplary embodiment according to FIG. 13, the damping element 16 is positioned without play or virtually without play around the bushing core 7 and has the effective radial play s' relative to the connecting section 40. The connecting section 40, which in this embodiment also functions as a radial stop 17 for the damping element 16, can in a modification of the embodiment according to FIG. 13 also be inclined at an angle α relative to the axial direction A. In such an embodiment, the damping element 16 can have an inclined surface (not shown in FIGS. 13 and 14) that corresponds to the inclined position of the connecting section 40.

Figure 14:
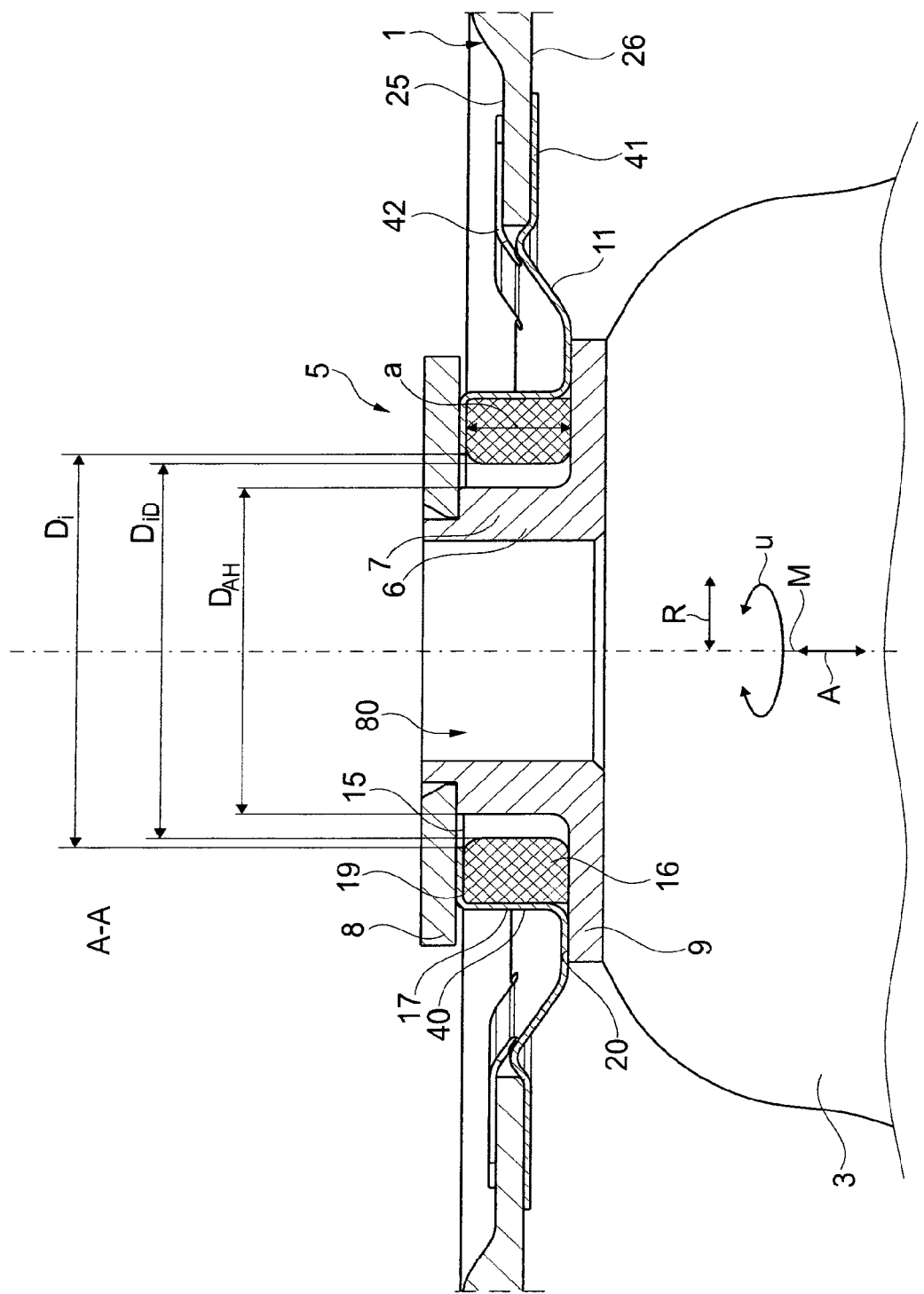
FIG. 14: shows the section along the line A-A, with a fastening device in a ninth embodiment.

Another embodiment of the fastening device 5 according to the invention shown in FIG. 14 corresponds essentially to the embodiment shown in FIG. 13. By contrast with the latter, the damping element 16 is dimensioned so that it rests radially against the radial stop 17 without play, i.e. rests against the connecting section 40. The damping element 16 has its effective radial play s' relative to the bushing core 7 of the collar bushing 6, with the relative radial play s' being expressed by the following equation $$s'=D_{iD}-D_{AH}.$$

Figure 15:
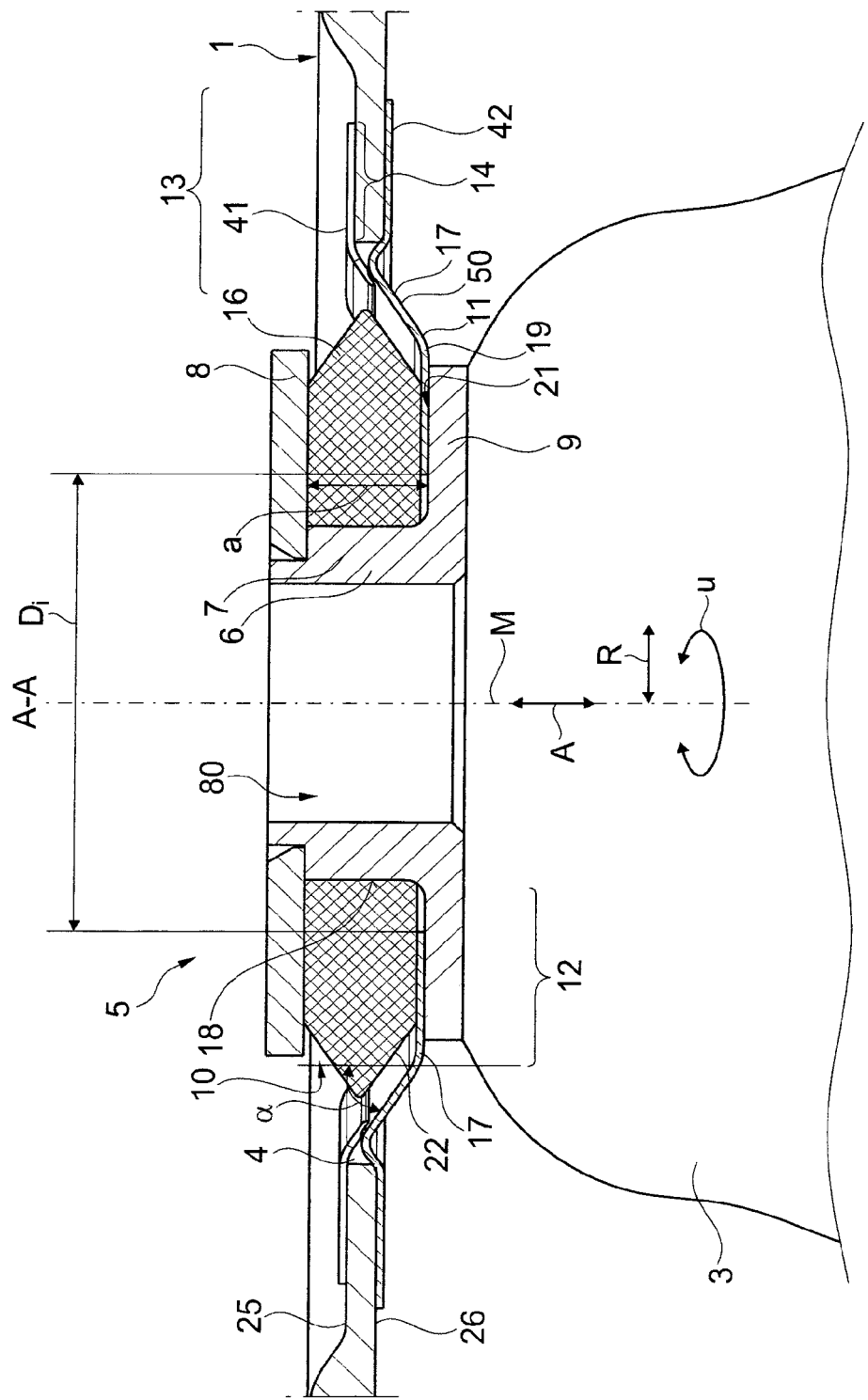
FIG. 15: shows the section according to FIG. 2, along the line A-A, with a fastening device in a tenth embodiment.
Figure 16:
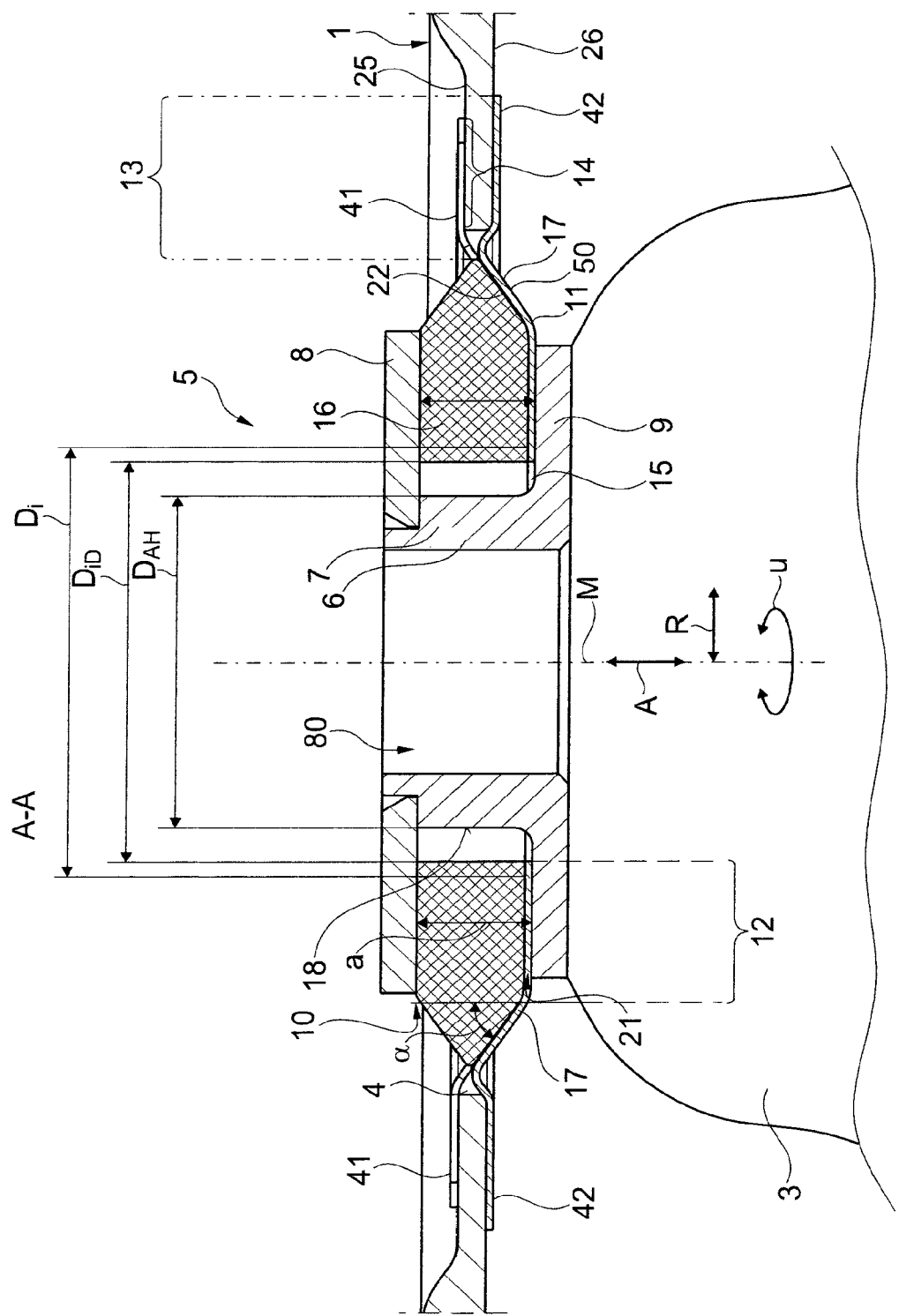
FIG. 16: shows the section according to FIG. 2, along the line A-A, with a fastening device in an eleventh embodiment.

In another embodiment of the invention according to FIGS. 15 and 16, the bridge element 11 is embodied of a single layer and by contrast with the embodiments described above, has only a first sliding section 19, which is formed in the gap 21 between the damping element 16 and one of the collars 9. The first sliding section 19 in this case is guided so that it is able to move in the radial direction R between the damping element 16 the collar 9.

On its radial outside, the first sliding section 19 is adjoined by a transition section 50, which connects the first sliding section 19 to the radially outer region 13 of the bridge element 11.

In this embodiment, the bridging section 50 serves as a radial stop 17 for the damping element 16. The radial stop 17 is inclined by an angle α relative to the axial direction A. The damping element 16 has a corresponding inclined surface 22, which can cooperate with the radial stop 17 in such a way that the reduced play s' is formed between the damping element 16 and the radial stop 17, i.e. the transition section 50 of the bridge element 11.

This embodiment of the bridge element 11 makes it possible for the bridge element 11 to be produced in a particularly simple way and to be embodied as a single-layer stamped and bent part.

The radially outer region 13 of this embodiment is embodied analogously to the radially outer region 13 of the above-described embodiments according to FIGS. 13 and 14 and has tabs 41, 42 that are formed onto the bridge element 11 of one piece with the latter and which produce a force fit for the hole rim 14 of the shielding part 1.

In the embodiment according to FIG. 15, the radial inside of the damping element 16 rests against the bushing core 7 of the bushing 6 without play or virtually without play, thus yielding the effective radial play s' between the damping element 16 and the radial stop 17.

Another embodiment according to FIG. 16 differs from the embodiment described above according to FIG. 15 only in that the damping element 16 is dimensioned so that at its radial outside, it rests with its inclined surface 22 against the radial stop 17, i.e. the connecting section 40, and in this way, is radially immobilized relative to the bridge element 11. The reduced effective radial play s' in this case is formed on the radial inside between the damping element 16, i.e. its inner diameter $D_{iD}$, and the outer diameter of the bushing core 7, i.e. the diameter $D_{AH}$. In a radial movement in the radial direction R, the bushing 6 slides with its collar 8 on the damping element 16 and with the collar 9 relative to the bridge element 11.

All of the above-described embodiments of the fastening device 5 according to the invention share the fact that the bushing 6 with the bushing core 7 and the collars 8, 9 unites the bridge element 11 and the damping element 16 in module-like fashion and bundles the above-mentioned parts together in captive fashion.

In this regard, the fastening device 5 according to the invention can be simply preassembled as a module before being inserted into the shielding part 1 as a whole in the form of an assembled unit.

In this case, the bushing 6 with the collars 8, 9 is either embodied integrally and in one piece in a known way or as in the embodiments of the figures, is embodied of two pieces. The collar bushing 6 in this case has a single piece, which forms the bushing core 7 and one of the collars 8, 9 and is thus approximately L-shaped in cross-section. The second collar 9 is embodied in the form of a washer, which is connected to the second component that constitutes the bushing core 7 and the collar 9. Such a connection can be produced in a known way by means of caulking as a form-fitting connection, for example by means of welding or soldering as an integrally joined connection, or by means of pressing, for example as a nonpositive, frictional connection. Many variants from the prior art are known for the embodiment of the bushings 6.

All of the above-described embodiments of the fastening device 5 according to the invention share the fact that the radially outer region 13 is embodied so that it is immobilized on the shielding part 1 for the operating forces that are to be expected during operation of a shielding part 1. Consequently, no relative movement takes place between the bridge element 11 in the axial, radial, or circumference direction U during operation. This successfully prevents any corrosion protection coatings that have been applied to the shielding plate or more precisely, its outsides 25, 26, from being destroyed by relative movement between metallic components.

The present invention also makes it possible to provide a sliding seat of the bushing 6 relative to the bridge element 11, i.e. in the installed state, also relative to the shielding part 1 in order to be able to compensate for thermal expansions of the shielding part 1.

The invention claimed is:

1. A fastening device for fastening a shielding part to a fastening partner in a vibration-decoupled manner, the fastening device comprising:
   a collar bushing that has at least one bushing core and two collars that protrude outward in a radial direction (R) relative to a center axis of the collar bushing and are spaced apart from each other in an axial direction (A), with the collars forming an interstice between themselves in the axial direction (A);
   a bridge element, which is positioned with its radially inner region in the interstice and can be connected to the shielding part with its radially outer region; and, wherein the bushing core extends through an opening of the bridge element with a radial play (s) and the bridge element can be moved radially relative to the bushing core; and
   a damping element positioned in the axial direction (A) between the collars and positioned in the radial direction (R) between the bushing core and a radial stop of the bridge element, wherein the bridge element is supported in a radially movable fashion with a first sliding section in a gap between the damping element and one of the collars, wherein the bridge element has the first sliding section and at least one other sliding section and is supported with the sliding sections axially against the opposite insides of the collars facing the interstice, and the damping element is dimensioned so that a radial mobility of the bridge element relative to the bushing core is limited to an effective radial play (s') that is reduced relative to the radial play (s).

2. The fastening device according to claim 1, wherein the damping element is more deformable in comparison to the bridge element and/or in comparison to the collar bushing or in comparison to the bushing core.

3. The fastening device according to claim 1, wherein a connecting section of the bridge element, which connects the sliding sections to each other or connects the one sliding section to the radially outer region, is embodied as a radial stop.

4. The fastening device according to claim 1, wherein contact regions between the sliding sections and the insides of the collars overlap radially when viewed in the axial direction (A).

5. The fastening device according to claim 1, wherein contact regions between the sliding sections and the insides of the collars do not radially overlap or have a radial spacing relative to each other.

6. The fastening device according to claim 1, wherein the radial stop delimits the interstice radially toward an outside of the collar bushing.

7. The fastening device according to claim 1, wherein a radial inside of the damping element rests against an outside of the bushing core facing the interstice and is able to move together with the collar bushing radially relative to the bridge element.

8. The fastening device according to claim 1, wherein a radial outside of the damping element rests against an inside of the radial stop facing the interstice and the effective radial play (s') is produced between the damping element and the bushing core, with the damping element being able to move radially together with the bridge element relative to the collar bushing.

9. The fastening device according to claim 1, wherein the effective radial play (s') is ≤0 so that the damping element is positioned without radial play or in a radially prestressed fashion between the bushing core and the radial stop.

10. The fastening device according to claim 1, wherein the damping element comprises at least one of the group consisting of a wire mesh, wire crocheted fabric, wire woven, wire tangle, or wire knit composed of a metal wire or plastic wire or is composed of a metal foam or plastic foam.

11. The fastening device according to claim 1, wherein the bridge element is a single layer in the form of a stamped and bent part or a deep-drawn stamped part.

12. The fastening device according to claim 1, wherein the bridge element has a multi-layer design and at least a first part forms a first sliding section and a second part forms a second sliding section.

13. The fastening device according to claim 12, wherein at least one part of the bridge element is a stainless steel sheet with a thickness of 0.2 mm to 0.5 mm.

14. The fastening device according to claim 1, wherein the collar bushing bundles at least the bridge element and the damping element in captive fashion so that the fastening device can be preassembled as a module and, as a preassembled subassembly that forms a single unit, can be inserted into a receiving hole of the shielding part.

15. The fastening device according to claim 1, wherein radially outside the collar bushing, the bridge element has connecting elements in the form of a plurality of tabs and the tabs are embodied of one piece with one part or with one of a plurality of parts of the bridge element.

16. The fastening device according to claim 1, wherein the radial stop —viewed in cross-section—is at least partially inclined at an angle ($\alpha$) to the axial direction (A).

17. The fastening device according to claim 16, wherein the damping element has at least one inclined surface that is embodied in accordance with the inclined radial stop.

18. The fastening device according to claim 1, wherein in a vicinity of the sliding sections, the bridge element and/or the insides of the collars has/have raised areas and/or recesses so that the sliding sections are supported relative to the collars by point contact or linear contact or by defined sliding surfaces.

19. A shielding part, particularly having at least one fastening device according to claim 1.

* * * * *